(12) United States Patent
Delmas et al.

(10) Patent No.: US 7,532,780 B2
(45) Date of Patent: May 12, 2009

(54) METHOD FOR LOCATING AND MEASURING DEFORMATIONS IN A WORK OF CIVIL ENGINEERING

(75) Inventors: Philippe Delmas, Fontenay le Fleury (FR); Alain Nancey, Boissy l'Aillerie (FR); Marc Voet, Geel (BE); Johan Vlekken, Diepenbeek (BE); Els Schoubs, Rotselaar (BE)

(73) Assignees: Ten Cate Geosynthetics France, Bezons (FR); Fiber Optic Sensors & Sensing Systems, Geel (BE)

( * ) Notice: Subject to any disclaimer, the term of this patent is extended or adjusted under 35 U.S.C. 154(b) by 0 days.

(21) Appl. No.: 10/593,637

(22) PCT Filed: Mar. 24, 2004

(86) PCT No.: PCT/FR2004/000721

§ 371 (c)(1),
(2), (4) Date: Jun. 11, 2007

(87) PCT Pub. No.: WO2005/103606

PCT Pub. Date: Nov. 3, 2005

(65) Prior Publication Data

US 2007/0279632 A1    Dec. 6, 2007

(51) Int. Cl.
*G02B 6/00* (2006.01)
*G02B 6/34* (2006.01)

(52) U.S. Cl. .............................. 385/13; 385/12; 385/31; 385/37; 385/39

(58) Field of Classification Search .................... 385/13
See application file for complete search history.

(56) References Cited

U.S. PATENT DOCUMENTS

| | | | | |
|---|---|---|---|---|
| 5,723,857 A | * | 3/1998 | Underwood et al. | ... 250/227.14 |
| 5,987,197 A | * | 11/1999 | Kersey | ........................ 385/24 |
| 6,204,920 B1 | * | 3/2001 | Ellerbrock et al. | .......... 356/477 |
| 6,211,964 B1 | * | 4/2001 | Luscombe et al. | .......... 356/477 |
| 6,256,090 B1 | * | 7/2001 | Chen et al. | .................. 356/73.1 |
| 6,274,863 B1 | * | 8/2001 | Kersey | .................. 250/227.14 |
| 6,492,636 B1 | * | 12/2002 | Chen et al. | ............. 250/227.14 |

(Continued)

FOREIGN PATENT DOCUMENTS

FR    2728677 A    6/1996

(Continued)

*Primary Examiner*—Frank G Font
*Assistant Examiner*—Ryan Lepisto
(74) *Attorney, Agent, or Firm*—Manelli Denison & Selter; Edward J. Stemberger

(57) ABSTRACT

A process for locating and measuring deformation in a civil engineering structure wherein at least one geosynthetic fabric (1) containing a plurality of optical fibers (2a to 2e) in parallel and capable of transmitting signals is applied in the structure or under the structure. The optical fibers contain Bragg gratings (3), evenly spaced in series (4) of N1 consecutive gratings that correspond to the same wavelength. The series is distributed in identical sets, each of which contains N2 consecutive series that correspond to the different wavelengths, and, in at least two optical fibers, the numbers N1 of gratings of a series and the numbers N2 of series (4) of a set (5) are determined to locate the deformations to which the structure is subjected on the one hand and, on the other, to measure the elongation of the said optical fibers where the deformation occurs.

9 Claims, 2 Drawing Sheets

U.S. PATENT DOCUMENTS

| | | | |
|---|---|---|---|
| 6,522,797 B1 * | 2/2003 | Siems et al. | 385/12 |
| 6,591,025 B1 * | 7/2003 | Siems et al. | 385/12 |
| 6,668,105 B2 * | 12/2003 | Chen et al. | 385/13 |
| 7,060,967 B2 * | 6/2006 | Thingbo et al. | 250/227.18 |
| 7,295,724 B2 * | 11/2007 | Wang et al. | 385/13 |
| 2006/0215956 A1 * | 9/2006 | Adachi et al. | 385/27 |
| 2007/0262247 A1 * | 11/2007 | Becerra et al. | 250/227.14 |

FOREIGN PATENT DOCUMENTS

| | | |
|---|---|---|
| FR | 2844874 A | 3/2004 |
| WO | WO99/09370 A | 2/1999 |

* cited by examiner

METHOD FOR LOCATING AND MEASURING DEFORMATIONS IN A WORK OF CIVIL ENGINEERING

BACKGROUND OF THE INVENTION

The invention relates to process for locating and measuring deformations in a civil engineering structure.

During the construction of motorways or railway lines, a great deal of civil engineering work is carried out to support the infrastructure of the road or track. But certain sites comprise unidentified natural or artificial cavities. In this case, unexpected subsidence may occur during the construction of the new road or track, or later during its operation, causing serious accidents due to the overloading of such fragile zones, the infiltration of water, drought and shaking.

To avoid such accidents, it would be necessary to make systematic soundings of the site before carrying out the civil engineering work. Such soundings are indeed carried out in land normally subject to subsidence.

Nevertheless, certain sites, not subject to natural landslide (rock slide) were, in former times, occupied by underground military installations, the existence of which is now unknown.

Systematic soundings are very costly and, in addition, they have to be taken close to each other, under and in the vicinity the proposed road or track to guarantee absolute safety.

Furthermore, even in the absence of cavities in the land, the soil may be subject to uneven settlement under certain sections the road or track following successive wet periods and drought, which may lead to ground subsidence, the amplitude of which is certainly limited, but affects safety particularly when it concerns tracks for high speed trains.

In order to limit the risk of subsidence of infill (embankment), it is common practice to lay sheets (laps) or strips of woven or non woven geosynthetic fabric on the soil and in the infill, to stiffen the infill, in the event of subsidence in the soil. In this case, the threads (yarns) of the geosynthetic fabric are subject to considerable forces which lead to a deformation by elongation of the threads and which may cause them to break, hence the collapse of the infill.

In order to detect deformations in a civil engineering structure, at pre-defined thresholds, FR 2 728 677 has suggested incorporating parallel threads in the geosynthetic fabric, which are capable of transmitting signals and calibrated to pre-determined elongation at break values. The deformation threshold attained is measured by sending signals through the threads and by detecting the presence or absence of response to such signals.

The threads may be electrical wires or optical fibres. The measurement is taken by all or nothing, and location of the deformation at a pre-defined threshold is only possible by placing two sets of parallel threads perpendicular to each other.

The purpose of the invention is to provide a process which provides for the location of the deformation on the one hand and, on the other, the measurement of the elongation of threads where the deformation occurs, before the threads break, using a geosynthetic fabric with a single set of threads, preferably laid parallel to the length of the structure.

SUMMARY OF THE INVENTION

The invention achieves its purpose by the fact that at least one geosynthetic fabric fitted with a plurality of optical fibres in parallel, capable of transmitting signals is applied to the structure or under the structure, the said optical fibres comprising Bragg gratings, evenly spaced and distributed in a series of N1 consecutive gratings with the same wavelength, the said series being laid in identical sets, each of which has N2 consecutive series with different wavelengths, and by the fact that, in at least two optical fibres, the number N1 of gratings in a series and the number N2 of series in a set are determined in such a way that the measurement of differences between the wavelengths of the incident light transmitted to each of the said optical fibres and wavelengths of the light reflected by the Bragg gratings enable, on the one hand, to locate deformation of the structure and, on the other, to measure the elongation of the said optical fibres where the deformation occurs.

The invention therefore uses the known properties of Bragg gratings used in strain gauges, as described in WO 86/01303, in particular.

The Bragg gratings are placed at equal distance of each other in all the optical fibres, but the lengths of the series or sets are different for at least one pair of optical fibres to allow for the simple location of structural deformations by determining the wavelength of reflected light which has been distorted in relation to the corresponding wavelength of incident light; the amplitude of such distortions gives an indication of the amplitude of the elongation of the optical fibres in the location concerned.

Advantageously, in at least two optical fibres, the numbers N1 of the gratings of a series are equal and the numbers N2 of series in a set are prime to each other.

Therefore, for example, let us assume that the distance between two Bragg gratings is 1 meter, that the number N1 is 10, a series of gratings therefore extends over 10 meters. Let us also assume that the first fibre contains seven series per set and can therefore handle seven different frequencies, and that the second fibre contains ten series per set, the FIGS. 10 and 7 being prime to each other. A set of the first fibre therefore extends over 70 meters, and the set of the second fibre extends over a length of 100 meters. These two fibres enable us to locate, with precision, a structure over a total length of 700 meters. If furthermore, the geosynthetic fabric contains a third optical fibre with Bragg gratings 1 meter apart and in series of 10 consecutive Bragg gratings, and each set contains three series, the FIG. 3 being prime with 7 and 10, the three optical fibres enable us to locate with precision deformations in a structure of 2100 meters in length. The deformation is located to the nearest 10 meters, which corresponds to the length of a series of 10 Bragg gratings. This level of precision is perfectly adequate for the monitoring of civil engineering structures.

Obviously the rule for the distribution of Bragg gratings on two optical fibres may differ from that given above as an example.

Therefore, for example, according to another distribution rule, in at least one optical fibre the number N1 of gratings in a series is equal to the number of gratings of a set in another optical fibre.

For example, the first optical fibre contains a set of 10 series, and each series contains 100 identical Bragg gratings 1 meter apart. The second optical fibre contains sets of 10 series, and each series contains 10 Bragg gratings 1 meter apart. These two optical fibres provide for the accurate location of a deformation in a structure 1 kilometer in length.

The invention also relates to a geosynthetic fabric for the application of the process.

According to the invention, this geosynthetic fabric is characterised by the fact that it contains a plurality of optical fibres in parallel, the said optical fibres containing Bragg gratings evenly spaced in series of N1 consecutive gratings that correspond to the same wavelength, the said series being themselves distributed in identical sets of N2 consecutive series that correspond to different wavelengths.

The optical fibres are advantageously inserted during production of the geosynthetic fabric. They should preferably be laid in the main direction of the sheet or lap, but may also be laid crosswise if necessary.

Advantageously, the optical fibres include a sheath for protection against shear failure, due to aggressive agents in the soil, and against the influence of water with a high pH (contact with concrete) and other corrosive agents.

Advantageously, optical fibres are laid in the direction of the length of the said geosynthetic fabric.

BRIEF DESCRIPTION OF THE DRAWINGS

Other advantages and characteristics of the invention shall be clarified on reading the description below given as an example and with reference to the drawings appended in which.

DETAILED DESCRIPTION OF THE EXEMPLARY EMBODIMENT

Figure 1:
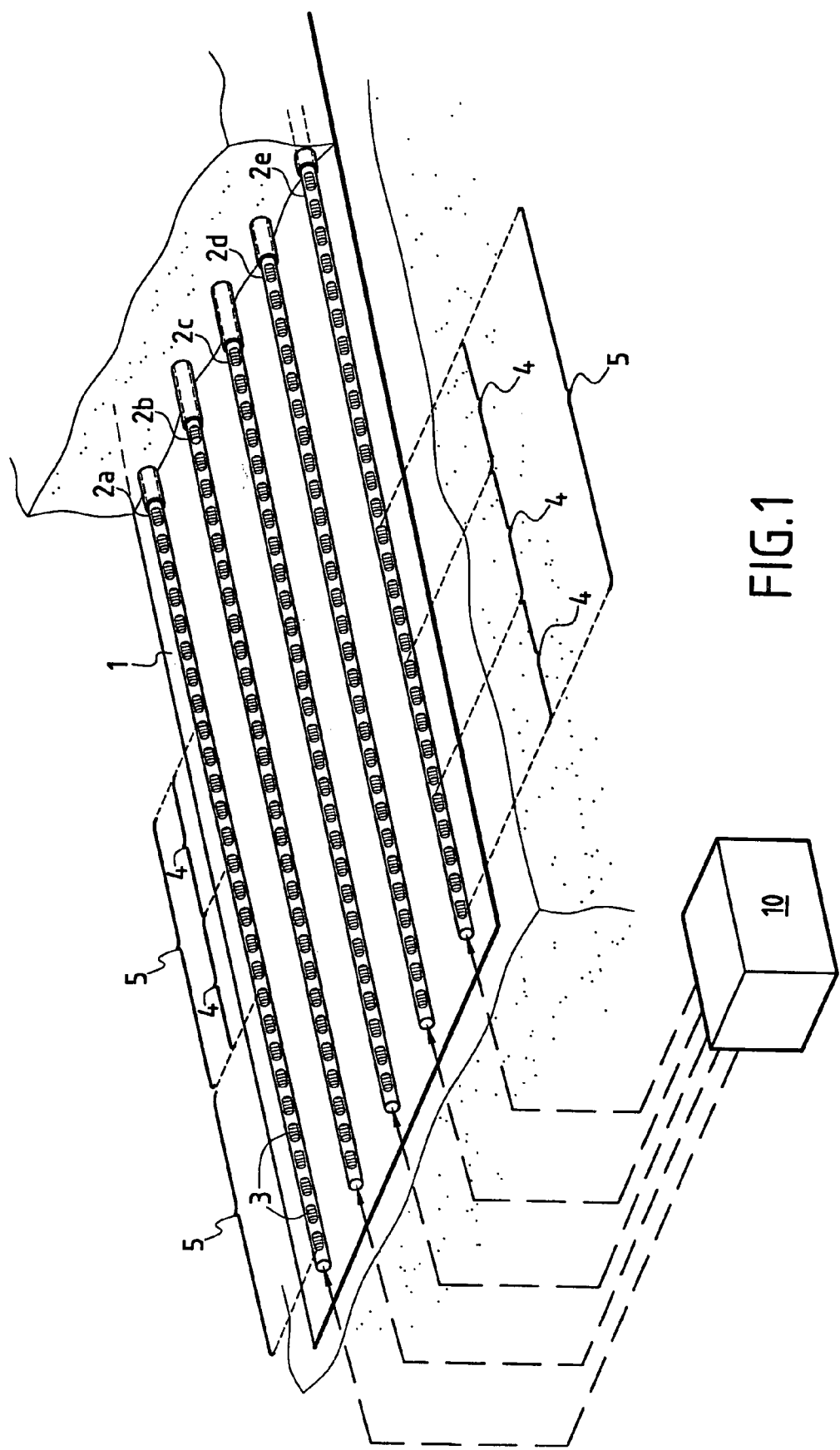
FIG. 1 is a perspective view of a geosynthetic fabric with optical fibres containing Bragg gratings.

FIG. 1 is a perspective view of a geosynthetic fabric 1 with optical fibres 2a to 2e containing the low reflectivity Bragg gratings 3 and designed to be used to reinforce a civil engineering structure, the infill of a motorway or railway line for example.

The Bragg gratings 3 are evenly spaced along the optical fibres 2a to 2b at a distance of 1 meter for example, and are distributed in series 4 which include a number N1 of identical gratings 3; that is, capable of reflecting part of incident light with a clearly determined wavelength in the absence of stress and the wavelength of reflected light, which changes value according to the stress applied longitudinally on the corresponding optical fibre. In the example shown in FIG. 1, the series 4 of the five optical fibres 2a to 2b include the same number N1 of gratings 3 and therefore extend over the same length.

Several consecutive series 4, which correspond to the different wavelengths making up a set 5 of gratings and is reproduced along the entire length of the fibres.

At least two optical fibres in the geosynthetic fabric 1 include the sets 5 with the numbers N2 of different sets, and we can even produce a geosynthetic fabric 1 in which all the optical fibres 2a to 2e include sets 5 of Bragg gratings with numbers N2 of different sets.

The numbers N2 are preferably prime to each other, to provide for the precise location of possible deformations of the geosynthetic fabric 1.

The optical fibres 2a and 2b should preferably be laid in the direction of the length of the geosynthetic fibre 1 which is wound on to a tape reel, for transport.

The optical fibres 2a to 2e are laid at a distance of 1 meter apart, for example. Once the geosynthetic fabric 1 is laid flat on the soil, the gratings 3 form a square mesh. But this mesh does not have to be square, without going beyond the scope of the invention. Nevertheless, this mesh should not be too wide, to allow for the detection of deformations above occasional subsidence of the roof of an underlying cavity with a small cross-section in the horizontal planes.

The geosynthetic fabric 1 is usually approximately 5.5 meters wide, and if the width of the civil engineering structure to be reinforced is greater than that of the geosynthetic fabric 1, several strips of geosynthetic fabric are laid side by side. These strips may also be superimposed in the structure to be reinforced.

To avoid the shear failure of the optical fibres 2a to 2b, failure due to aggressive agents in the soil for example, and to protect them against the influence of water, high pH values and other corrosive agents, the optical fibres 2a to 2e are placed in an appropriate protective sheath.

The optical fibres 2a to 2b are connected at one end of the geosynthetic fabric to a control system 10 which includes means for transmitting light in the core of the optical fibres 2a to 2e, means for measuring the frequencies of the light reflected by the Bragg gratings 3, means for measuring the differences between the wavelengths of light reflected during operation and the wavelengths of light reflected, in the absence of stress, that is, during the construction of the structure, calculation means to indicate the location of possible deformation and the elongation of optical fibres due to structural deformations, means for the storage of data, means to display the results and, if necessary, warning means to give the alarm.

Figure 2:
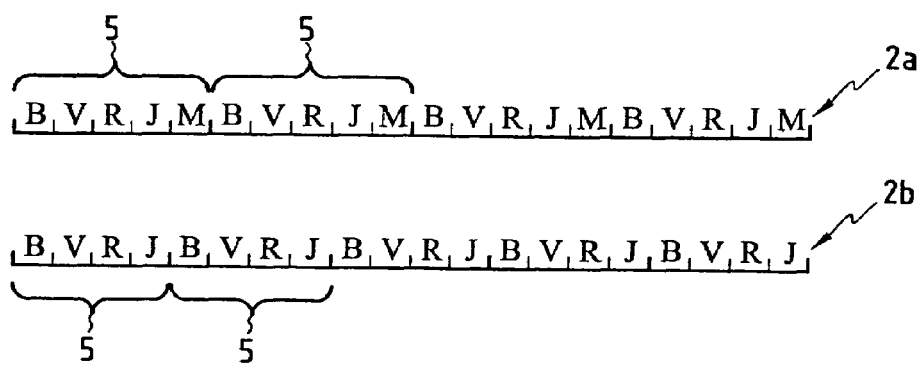
FIG. 2 shows a first form of the distribution of Bragg gratings in identical sets of different series in two optical fibres.
Figure 3:
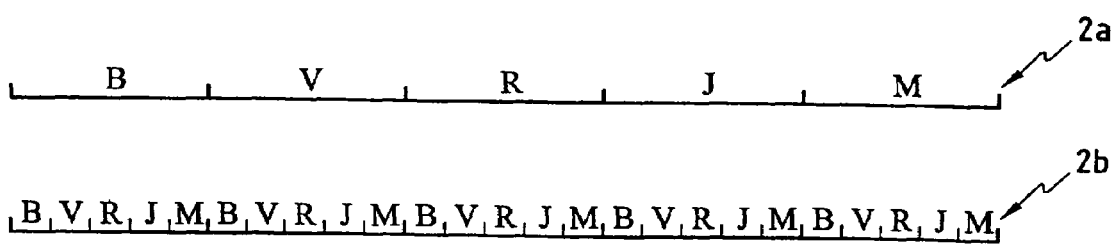
FIG. 3 shows a second form of the distribution of Bragg gratings in identical sets of different sets in two optical fibres.

In FIGS. 2 and 3, we have given the references B, V, R, J, and M to the series 4 of gratings that correspond to predetermined, different wavelengths.

In FIG. 2, the optical fibre 2a contains the sets 5 containing five series with the references B, V, R, J, M and the optical fibre 2b contains the sets 5 containing four series with the references B, V, R, J.

It should be noted that over a length of geosynthetic fabric that correspond to twenty series 4 of gratings 3, a deformation in a series, the fourteenth series from the left for example, shall be recognised by the control system 10 by the fact that the wavelength referenced I on the optical fibre 2a has shifted and the wavelength referenced V on the optical fibre 2b has shifted, and each combination of two wavelengths correspond to a precise position of series.

In FIG. 3, the optical fibre 2b contains five series with the references B, V, R, J and M per set and the optical fibre 2a contains, for example, five series with the references B, V, R, J and M, but the length of each series of the optical fibre 2a is equal to the length of a set of the optical fibre 2b.

Once again, each position of a series of the optical fibre 2b, from the left in FIG. 3, is identified precisely by the wavelength that corresponds to this series on the optical fibre 2b and the wavelength of the adjacent series on the optical fibre 2a, over a length of geosynthetic fabric that corresponds to twenty five series of the optical fibre 2b, and to a set of the optical fibre 2a.

The control system 10 is used to locate and measure the local stresses to which the optical fibres 2a to 2c are subjected following any deformation of the structure during its operation, by reading the wavelengths of the light reflected by the Bragg gratings 3 directly in the range of deformations between 0 and 3 or 4%, and to locate the level of deformation in the range between 3 or 4% and the rupture of an optical fibre which is at a level of deformation close to 8% or more, depending on the fibre used.

Following the laying of the geosynthetic fabric 1 and the construction of the structure or underlying structure, an initial measurement is taken to define the reference status of the system. The location of each grating of an optical fibre is found by identifying the wavelengths of the gratings 3 of all the optical fibres 2a and 2b aligned in the direction of the width of the geosynthetic fabric 1.

In the event of deformation which occurs after construction, the wavelengths of the light reflected by the Bragg gratings 3 where the deformation occurs are modified, whilst the wavelengths of the other Bragg gratings remain unchanged. We therefore obtain the location and measurement of the deformation.

The invention claimed is:

1. Process for locating and measuring deformations in soil or infill associated with a civil engineering structure, comprising
   providing at least one geosynthetic fabric (1) having yarns and containing a plurality of optical fibres (2a to 2e) in parallel and capable of transmitting signals, and
   applying the geosynthetic fabric in the said structure or on soil under the said structure,
   the said optical fibres containing Bragg gratings (3), evenly spaced in series (4) of N1 consecutive gratings that correspond to the same wavelength, the said series being themselves distributed in identical sets, each of which contains N2 consecutive series that correspond to different wavelengths, and by the fact that, in at least two optical fibres, the numbers N1 of gratings of a series and the numbers N2 of series (4) of a set (5) are determined in such as way that the measurement of differences between the wavelengths of the incident light transmitted in each of the said optical fibres and the wavelengths of the light reflected by the Bragg gratings enable to locate the deformations to which the structure is subjected on the one hand and, on the other, to measure the elongation of the said optical fibres where the deformation occurs.

2. Process according to claim 1, characterised by the fact that in at least two optical fibres, the numbers N1 of gratings of a series (4) are equal, and the numbers N2 of series (4) of a set (5) are prime to each other.

3. Process according to claim 1, characterised by the fact that in at least one optical fibre, the number N1 of gratings in a series is equal to the number of gratings of a set in another optical fibre.

4. Geosynthetic fabric for locating and measuring deformations in soil or infill associated with a civil engineering structure, comprising
   yarns, and
   a plurality of optical fibres (2a to 2e) in parallel, the said optical fibres containing Bragg gratings (3), evenly spaced in series (4) of N1 consecutive gratings that correspond to the same wavelength, the said series (4) being themselves distributed in identical sets (5) of N2 consecutive series that correspond to different wavelengths, and by the fact that, in at least two optical fibres, the numbers N1 of gratings of a series and the numbers N2 of series (4) of a set (5) are determined in such a way that the measurement of differences between the wavelengths of the incident light transmitted in each one of the said optical fibres and the wavelengths of the light reflected by the Bragg gratings enable, on the one hand, to locate the deformations to which the structure is subjected and, on the other hand, to measure the elongation of the said optical fibres where the deformation occurs.

5. Geosynthetic fabric according to claim 4, characterised by the fact that the optical fibres (2a to 2e) include a sheath to protect them against shear failure, due to aggressive agents in the soil, and against corrosion.

6. Geosynthetic fabric according to one of the claims 4 or 5, characterised by the fact that the optical fibres (2a to 2e) are laid in the direction of the length of the said geosynthetic fabric.

7. Geosynthetic fabric according to any one of the claims 4 or 5, characterised by the fact that the optical fibres are inserted in the said geosynthetic fabric during its manufacture.

8. Geosynthetic fabric according to claim 4, characterised by the fact that in at least two optical fibres, the numbers N1 of gratings of a series (4) are equal, and the numbers N2 of series (4) of a set (5) are prime to each other.

9. Geosynthetic fabric according to claim 4, characterised by the fact that in at least one optical fibre, the number N1 of gratings in a series is equal to the number of gratings of a set in another optical fibre.

* * * * *